United States Patent
Jung et al.

(10) Patent No.: US 11,577,613 B2
(45) Date of Patent: Feb. 14, 2023

(54) SYSTEM AND METHOD OF CONTROLLING SOLAR ROOF OF VEHICLE

(71) Applicants: Hyundai Motor Company, Seoul (KR); Kia Motors Corporation, Seoul (KR)

(72) Inventors: Hae-Yoon Jung, Gyeonggi-do (KR); Sung-Geun Park, Gyeonggi-do (KR); Seung-Bae Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 16/929,991

(22) Filed: Jul. 15, 2020

(65) Prior Publication Data
US 2021/0221233 A1  Jul. 22, 2021

(30) Foreign Application Priority Data
Jan. 21, 2020  (KR) .......... 10-2020-0007755

(51) Int. Cl.
| | |
|---|---|
| *H02J 7/00* | (2006.01) |
| *B60L 8/00* | (2006.01) |
| *B60L 53/22* | (2019.01) |
| *H02J 7/35* | (2006.01) |
| *B60L 58/22* | (2019.01) |
| *B60L 58/13* | (2019.01) |
| *H02S 40/38* | (2014.01) |

(52) U.S. Cl.
CPC ............. *B60L 8/003* (2013.01); *B60L 53/22* (2019.02); *B60L 58/13* (2019.02); *B60L 58/22* (2019.02); *H02J 7/35* (2013.01); *B60L 2240/36* (2013.01); *H02J 7/0014* (2013.01); *H02S 40/38* (2014.12)

(58) Field of Classification Search
CPC  B60L 53/22; B60L 58/22; B60L 58/13; H02J 7/35; H02J 7/0014
USPC .......................................... 320/134, 104, 107
See application file for complete search history.

(56) References Cited

U.S. PATENT DOCUMENTS

| | | | |
|---|---|---|---|
| 11,183,868 B2 * | 11/2021 | Park ......................... | B60L 53/00 |
| 2011/0301790 A1 * | 12/2011 | Atluri ...................... | B60L 58/20 |
| | | | 180/65.265 |
| 2012/0136534 A1 * | 5/2012 | Walsh ................. | H01M 10/465 |
| | | | 701/36 |
| 2015/0349582 A1 * | 12/2015 | Maeno .................... | B60L 58/20 |
| | | | 320/101 |
| 2015/0360558 A1 * | 12/2015 | Maeno .................... | B60L 8/003 |
| | | | 903/903 |
| 2016/0089986 A1 * | 3/2016 | Maeno .................... | B60L 58/20 |
| | | | 320/101 |

(Continued)

FOREIGN PATENT DOCUMENTS

| | | |
|---|---|---|
| KR | 100182664 B1 | 5/1999 |
| KR | 100182665 B1 | 5/1999 |
| KR | 101743855 B1 | 6/2017 |

*Primary Examiner* — Alexis B Pacheco
(74) *Attorney, Agent, or Firm* — Fox Rothschild LLP

(57) ABSTRACT

A system and a method of controlling a solar roof of a vehicle are provided. The system includes a solar cell panel and a controller that controls charging of a main battery and an auxiliary battery using power generated from the solar cell panel. A light amount sensor senses the amount of light collected in the solar cell panel and a temperature sensor measures a surface temperature of the solar cell panel.

9 Claims, 4 Drawing Sheets

(56) References Cited

U.S. PATENT DOCUMENTS

| | | | |
|---|---|---|---|
| 2016/0134157 A1* | 5/2016 | Maeno | H02J 7/35 |
| | | | 320/101 |
| 2016/0272069 A1* | 9/2016 | Maeno | B60L 8/003 |
| 2017/0057367 A1* | 3/2017 | Paryani | H02S 20/30 |
| 2017/0267113 A1* | 9/2017 | Harada | H02J 7/35 |
| 2018/0201150 A1* | 7/2018 | Kubo | B60L 58/25 |
| 2018/0233920 A1* | 8/2018 | Kodama | H02J 3/385 |
| 2018/0283887 A1* | 10/2018 | Dudar | G01C 21/3469 |
| 2019/0081502 A1* | 3/2019 | Botts | H02J 7/0024 |
| 2020/0231036 A1* | 7/2020 | Go | H01M 10/465 |
| 2020/0338990 A1* | 10/2020 | Jang | B60L 15/38 |
| 2020/0343761 A1* | 10/2020 | Kim | B60L 58/12 |
| 2021/0078428 A1* | 3/2021 | Jung | B60L 58/12 |
| 2021/0151992 A1* | 5/2021 | Bae | H02J 7/007188 |
| 2021/0221233 A1* | 7/2021 | Jung | B60L 58/22 |

* cited by examiner

| TEMPERATURE / LIGHT AMOUNT | -45 | -35 | -25 | -15 | -5 | 5 | 15 | 25 | 35 | 45 | 55 | 65 | 75 | 85 |
|---|---|---|---|---|---|---|---|---|---|---|---|---|---|---|
| 1   | 158  | 164   | 170 | 176   | 182   | 188   | 194   | 200 | 206   | 212   | 218   | 224   | 230 | 236   |
| 0.9 | 142.2| 147.6 | 153 | 158.4 | 163.8 | 169.2 | 174.6 | 180 | 185.4 | 190.8 | 196.2 | 201.6 | 207 | 212.4 |
| 0.8 | 126.4| 131.2 | 136 | 140.8 | 145.6 | 150.4 | 155.2 | 160 | 164.8 | 169.6 | 174.4 | 179.2 | 184 | 188.8 |
| 0.7 | 110.6| 114.8 | 119 | 123.2 | 127.4 | 131.6 | 135.8 | 140 | 144.2 | 148.4 | 152.6 | 156.8 | 161 | 165.2 |
| 0.6 | 94.8 | 98.4  | 102 | 105.6 | 109.2 | 112.8 | 116.4 | 120 | 123.6 | 127.2 | 130.8 | 134.4 | 138 | 141.6 |
| 0.5 | 79   | 82    | 85  | 88    | 91    | 94    | 97    | 100 | 103   | 106   | 109   | 112   | 115 | 118   |
| 0.4 | 63.2 | 65.6  | 68  | 70.4  | 72.8  | 75.2  | 77.6  | 80  | 82.4  | 84.8  | 87.2  | 89.6  | 92  | 94.4  |
| 0.3 | 47.4 | 49.2  | 51  | 52.8  | 54.6  | 56.4  | 58.2  | 60  | 61.8  | 63.6  | 65.4  | 67.2  | 69  | 70.8  |
| 0.2 | 31.6 | 32.8  | 34  | 35.2  | 36.4  | 37.6  | 38.8  | 40  | 41.2  | 42.4  | 43.6  | 44.8  | 46  | 47.2  |
| 0.1 | 15.8 | 16.4  | 17  | 17.6  | 18.2  | 18.8  | 19.4  | 20  | 20.6  | 21.2  | 21.8  | 22.4  | 23  | 23.6  |

°C : UNIT OF LIGHT AMOUNT : SUN

FIG 3

SYSTEM AND METHOD OF CONTROLLING SOLAR ROOF OF VEHICLE

CROSS-REFERENCE TO RELATED APPLICATIONS

This application claims priority under 35 U.S.C. § 119 to Korean Patent Application No. 10-2020-0007755, filed on Jan. 21, 2020, the disclosure of which is incorporated herein by reference in its entirety.

BACKGROUND

1. Field of the Invention

The present disclosure relates to a system and a method of controlling a solar roof of a vehicle, and more particularly, a system and a method of controlling a solar roof of a vehicle, which are capable of generating maximum power from a solar roof and more efficiently distributing the generated power.

2. Description of the Related Art

In general, a solar roof of a vehicle refers to a system in which a solar cell module that collects sunlight and converts the collected sunlight into electric energy is installed in an upper portion of a body of the vehicle to charge a main battery or an auxiliary battery with power generated in the solar cell module. The solar roof system includes a solar cell panel which collects sunlight and generates electromotive force, a converting unit which boosts a voltage of the electromotive force generated from the solar cell panel and a direct current (DC)-DC converter configured to convert the electromotive force, and a controller configured to operate a main battery and an auxiliary battery of a vehicle to be charged by using the electromotive force in the DC state converted in the converting unit.

In the related art, the solar roof is controlled by a method of distributing power generated in the solar cell panel without considering an electric characteristic of the solar cell panel, and thus, the utilization of the power using the solar roof is inefficient. In the meantime, as the prior arts for the solar roof of a vehicle, developed techniques disclose the technology of a charging control device using a solar cell mounted on a vehicle, the technology of a charging system of an electric vehicle, and the technology of a charging control device of an electric vehicle

SUMMARY

The present disclosure provides a system and a method of controlling a solar roof of a vehicle, which are capable of generating maximum power from a solar roof and more efficiently distributing the generated power.

An exemplary embodiment of the present disclosure provides a system and a method of controlling a solar roof of a vehicle and the system may include: a solar cell panel; a controller configured to operate a main battery and an auxiliary battery of a vehicle to be charged using power generated from the solar cell panel; a light amount sensor configured to sense the amount of light collected in the solar cell panel; and a temperature sensor configured to measure a surface temperature of the solar cell panel.

When a voltage of the power generated in the solar cell panel is equal to or greater than a predetermined initial starting voltage, the controller is configured to start, receive light amount data from the light amount sensor, receive temperature data from the temperature sensor, predict the amount of power generable by the solar cell panel under a current condition, and calculate an expected output power amount, and when the calculated expected output power amount is equal to or greater than a predetermined reference power amount, the controller may be configured to check the state of charge (SOC) data of the main battery and the auxiliary battery, select a battery requiring charging, and charge the selected battery.

The system and the method of controlling the solar roof of the vehicle of the present disclosure including the foregoing configuration generate and distribute maximum power according to an amount of sunlight and a temperature, thereby improving power generation efficiency of the solar roof. A battery may be more efficiently charged using the system for controlling the solar roof of the present disclosure, thereby improving an annual driving distance of an electric vehicle. Power may be generated more efficiently using the system for operating the solar roof of the present disclosure to achieve improvement of fuel efficiency, thereby further helping reduce the carbon dioxide credit which is a global environmental issue, actively responding to the environmental regulation in the future, and reducing fines.

BRIEF DESCRIPTION OF THE DRAWINGS

The above and other objects, features and advantages of the present disclosure will be more clearly understood from the following detailed description taken in conjunction with the accompanying drawings, in which:

FIG. 3 illustrates an example of a table of expected output power amounts of the solar cell panel according to the present disclosure.

DETAILED DESCRIPTION

Figure 1:
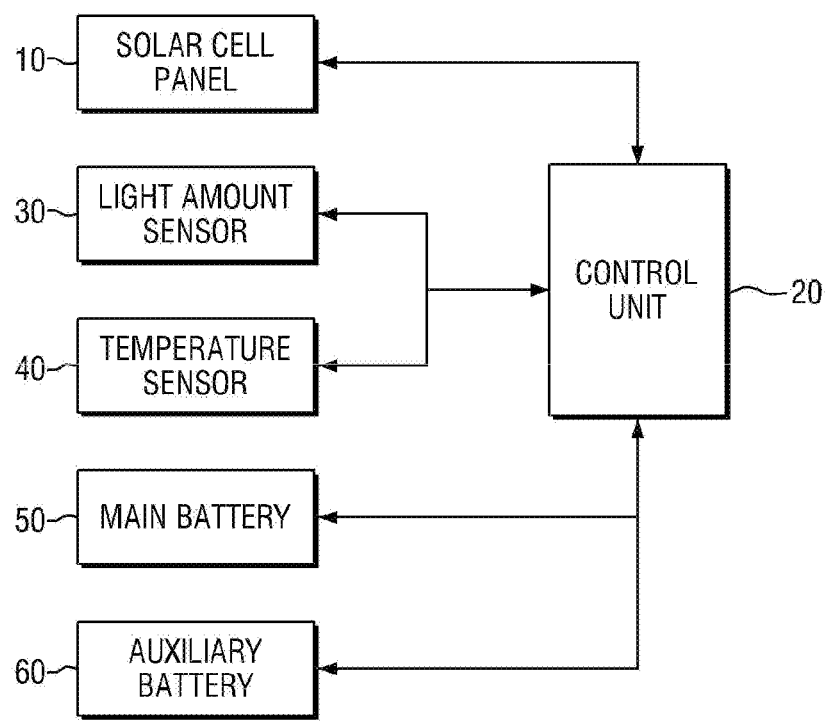
FIG. 1 is a block diagram of a system for controlling a solar roof of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. Notably, the controller is specifically programmed to execute the process described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a configuration and an operation of a system and a method of controlling a solar roof of a vehicle of the present disclosure will be described in detail with reference to the drawing. However, the disclosed drawings are provided as an example to sufficiently deliver the spirit of the present disclosure to those skilled in the art. Accordingly, the present disclosure is not limited to the drawings presented below and may also be specified in another form.

Unless otherwise defined, the terms used in the specification of the present disclosure may be used as a meaning commonly understandable by those skilled in the art, and in the following description and the accompanying drawings, detailed description of publicly known functions and constitutions may be omitted to avoid unnecessarily obscuring the subject matter of the present disclosure.

FIG. 1 is a block diagram of a system for controlling a solar roof of the present disclosure. Referring to the drawing, the system for controlling the solar roof of the present disclosure may include a solar cell panel 10 which collects sunlight and generates power, a controller 20 configured to operate a main battery 50 and an auxiliary battery 60 of a vehicle to be charged using the power generated in the solar cell panel 10, a light amount sensor 30 configured to sense the amount of light collected in the solar cell panel 10, and a temperature sensor 40 configured to measure a surface temperature of the solar cell panel 10.

Hereinafter, an example of the main battery is a battery that outputs a high voltage of 300 V or more for driving a motor that is a power source of an electric vehicle, and an example of an auxiliary battery is a battery that outputs a low voltage of 12 V. In particular, the controller 20 may be configured to start when a voltage of the power generated in the solar cell panel 10 is equal to or greater than an initial start voltage set in a memory (not illustrated) linked to the controller 20, and then may be configured to receive light amount data from the light amount sensor 30, receive temperature data from the temperature sensor 40, predict the amount of power generated in the solar cell panel 10 under a current condition, and calculate an expected output power amount. When the calculated expected output power amount is equal to or greater than a predetermined reference power amount, the controller 20 may be configured to check and determine the state of charge (SOC) data of the main battery 50 and the auxiliary battery 60, select a battery requiring charging, and charge the selected battery.

Herein, the controller 20 may be a controller that includes a converter configured to boost a voltage of the electromotive force generated in the solar cell panel 10 and DC-DC converter configured to convert the boosted electromotive force. The reference power amount refers to the minimum power amount consumed for maintaining the control of the electronic components of the vehicle in a starting-off state in which the vehicle is not started, and a current amount corresponding to the minimum power amount refers to a dark current.

Then, when the power generated in the solar cell panel 10 while charging the battery is less than the minimum power amount, the charging of the batteries 50 and 60 may be stopped. Herein, the expected output power amount calculated by the controller 20 is the power amount having a predetermined value according to the light amount data and the temperature data, and the values of the power amounts are pre-stored in the memory (not illustrated) linked to the controller 20 in the form of a table map.

Figure 2A:
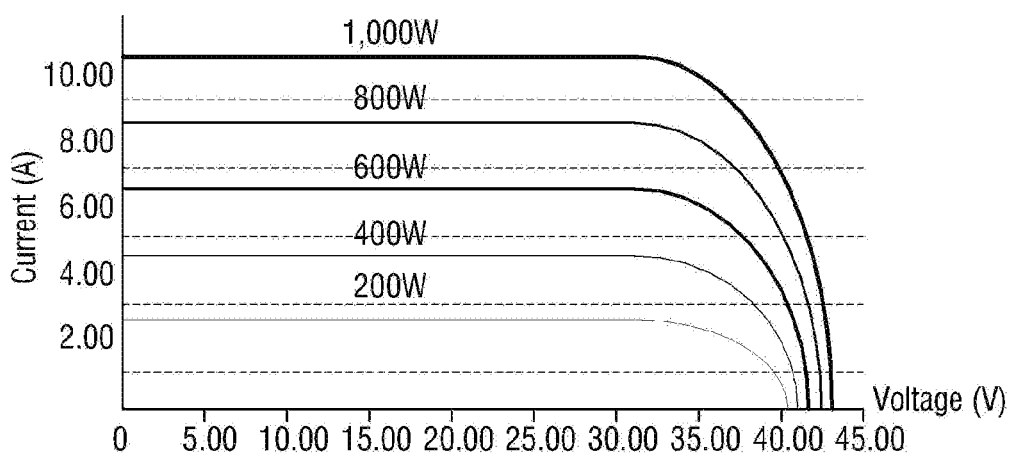
FIG. 2A is a graph illustrating voltage and current characteristics of a solar cell panel configuring the solar roof.
Figure 2B:
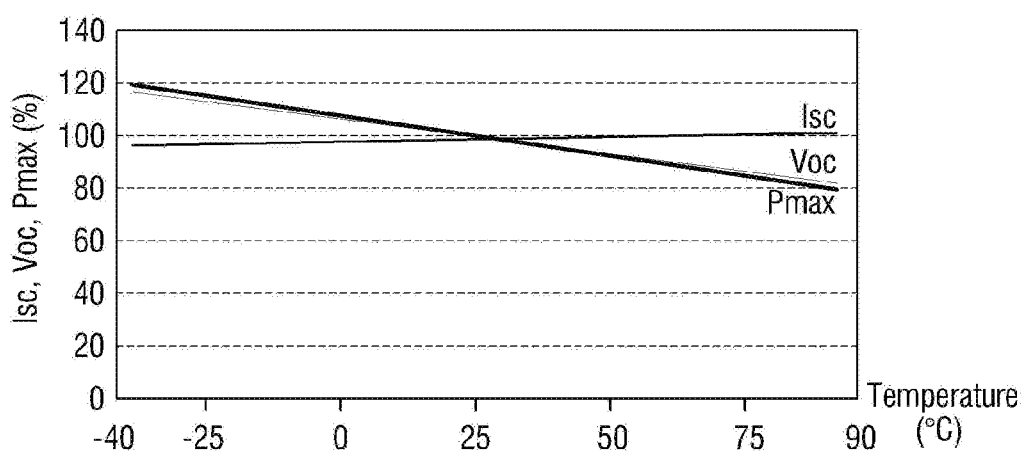
FIG. 2B is a graph illustrating temperature and power characteristics of the solar cell panel configuring the solar roof.

Particularly, FIG. 2A is a graph illustrating voltage and current characteristics of the solar cell panel 10 configuring the solar roof, and FIG. 2A shows that as the light amount is decreased from 1,000 W to 800 W, 600 W, 400 W, and 200 W, a voltage and a current of the solar cell panel 10 are decreased. FIG. 2B is a graph illustrating temperature and power of the solar cell panel 10 configuring the solar roof, and FIG. 2B shows that whenever the temperature rises 1° C. based on 25° C., a voltage decreases 0.24%, a current increases by 0.04%, and an output decreases 0.30%, and whenever the temperature drops 1° C., a voltage increases 0.24%, a current decreases by 0.04%, and an output increases 0.30%.

Accordingly, the expected output power amount of the solar cell panel 10 configuring the solar roof may be calculated by Equation 1 below using the graphs of the voltage and current characteristics and the power characteristics according to the temperature of the solar cell panel 10 like FIGS. 2A-2B.

$$Y = P\max * S_{light} * [1 - \{(C - Troof) * A\}] \quad \text{Equation 1}$$

\* Introductory remark

Y: Expected output power amount (unit: W)

Pmax: Maximum outputtable power of the solar cell panel (unit: W)

$S_{light}$: Light amount (light amount in the case of the maximum outputtable power of the solar cell panel (unit: SUN))

C: Surface temperature condition in the case of the maximum outputtable power of the solar cell panel (° C.)

Troof: Surface temperature of the solar cell panel (° C.)

A: Characteristic coefficient of the solar cell panel (different depending on the kind of solar cell panel)

FIG. 3 is an example of the table of the expected output power amount calculated in the case where maximum outputtable power of the solar cell panel is 200 W under the condition that a surface temperature is 25° C., a light amount is 1 SUN, and a characteristic coefficient of the solar cell panel is 0.003 using Equation 1, and the expected output power amounts according to the temperatures and the light amounts calculated in accordance with the characteristic of the corresponding solar cell panel and represented in the table may be stored in the form of a table map in the memory (not illustrated) liked with the controller 20.

Referring to the table of FIG. 3, when a surface temperature of the solar cell panel 10 is 25° C. and a light amount is 1 SUN, an expected output power amount of the solar cell panel 10 is 200 W. Herein, 1 SUN refers to the condition in which a light amount is 1,000 W/m², and thus, 0.5 SUN is 500 W/m² and 0.1 SUN is 100 W/m². In the meantime, the SOC data refers to the data representing the SOC of the battery.

Figure 4:
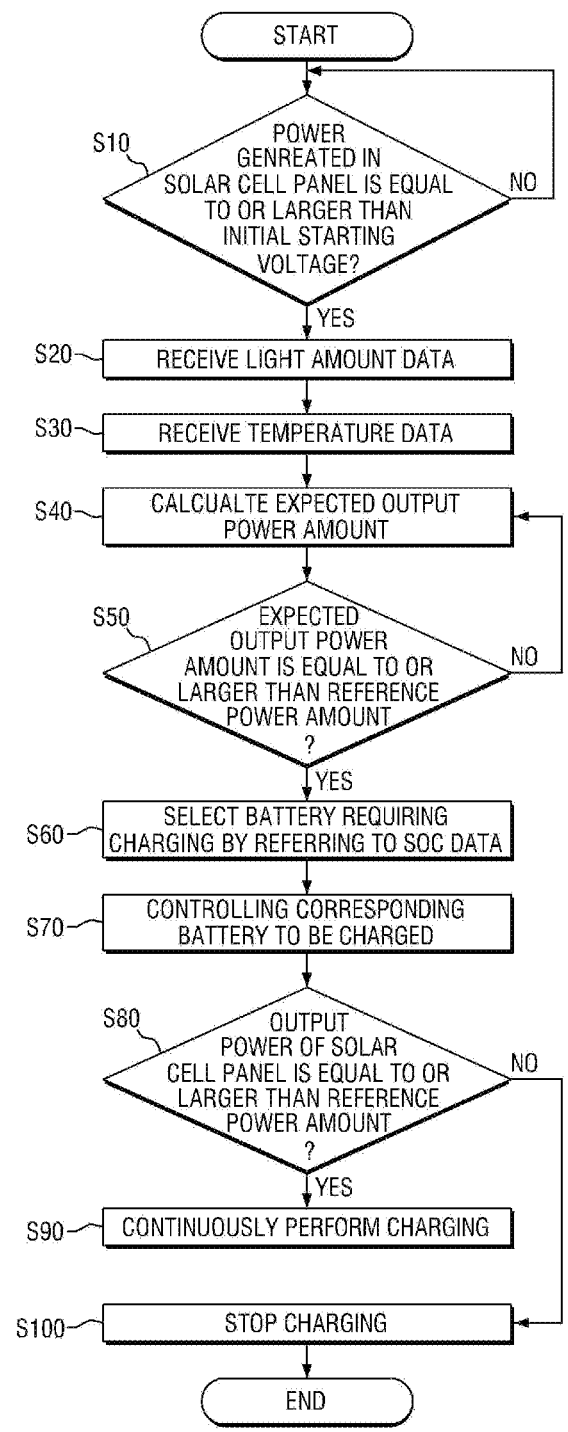
FIG. 4 is a flowchart illustrating a method of controlling a solar roof of a vehicle of the present disclosure.

Next, a method of controlling the solar roof of the vehicle of the present disclosure configured as described above will be described. FIG. 4 is a flowchart illustrating a method of controlling the solar roof of the vehicle of the present disclosure. The method of controlling the solar roof of the vehicle of the present disclosure is a control method performed by the system for operating the solar roof including the solar cell panel 10 configured to collect sunlight and generate power, the controller 20 configured to operate the main battery 50 and the auxiliary battery 60 of the vehicle to be charged using the power generated in the solar cell panel 10, the light amount sensor 30 configured to sense the amount of light collected in the solar cell panel 10, and the temperature sensor 40 configured to measure a surface temperature of the solar cell panel 10.

Referring to the drawing, first, in an initial state, the controller 20 may be configured to determine whether a voltage of the power currently generated in the solar cell panel 10 is equal to or greater than an initial start voltage set in the memory (not illustrated) liked with the controller 20 (S10). When the voltage of the power currently generated in the solar cell panel 10 is equal to or greater than the initial start voltage in operation S10, the controller 20 may be configured to receive current light amount data collected in the solar cell panel 10 from the light amount sensor 30 (S20) and receive current temperature data of a surface of the solar cell panel 10 from the temperature sensor 40 (S30).

Then, the controller 20 may be configured to calculate an expected output power amount that corresponds to the received light amount data and temperature data by referring to the table map of the expected output power amounts according to a light amount and temperature conditions of the corresponding solar cell panel stored in the linked memory (S40).

The controller 20 may then be configured to determine whether the calculated expected output power amount is equal to or greater than a predetermined reference power amount (S50), and when the calculated expected output power amount is equal to or greater than the predetermined reference power amount, the controller 20 may be configured to check and determine SOC data of the main battery 50 and the auxiliary battery 60 and select a battery requiring charging (S60). When the battery requiring the charging is selected in operation S60, the controller 20 may be configured to charge the corresponding selected battery (S70), and subsequently, determine whether output power of the solar cell panel 10 is equal to or greater than the reference power amount (S80), and when the output power of the solar cell panel 10 is equal to or greater than the reference power amount, the controller 20 may be configured to continuously perform the charging (S90), and when the output power of the solar cell panel 10 is less than the reference power amount, the controller 20 may be configured to stop the charging (S100).

What is claimed is:

1. A system for controlling a solar roof of a vehicle, comprising:
   a solar cell panel;
   a light amount sensor configured to sense a light amount collected in the solar cell panel;
   a temperature sensor configured to measure a surface temperature of the solar cell panel; and
   a controller configured to receive light amount data from the light amount sensor and receive temperature data from the temperature sensor to calculate an expected output power amount of the solar cell panel under a current condition, and operate a main battery and an auxiliary battery of a vehicle to be charged based on the calculated expected output power amount,
   wherein when a voltage of power generated in the solar cell panel is equal to or greater than a predetermined initial start voltage, the controller is configured to start and calculate the expected output power amount;
   wherein the expected output power amount is a power amount calculated using a graph of voltage and current characteristics according to the light amount data and a graph of a power characteristic according to the temperature data, and is pre-stored in a memory linked to the controller; and
   wherein the expected output power amount is calculated by:

$$Y = P\max * S_{light} * [1 - \{(C - \text{Troof}) * A\}]$$

wherein, * Introductory remark, Y: Expected output power amount (unit: W), Pmax: Maximum outputtable power of the solar cell panel (unit: W), $S_{light}$: Light amount (light amount in the case of the maximum outputtable power of the solar cell panel (unit: SUN)), C: Surface temperature condition in the case of the maximum outputtable power of the solar cell panel (° C.), Troof: Surface temperature of the solar cell panel (° C.), and A: Characteristic coefficient of the solar cell panel.

2. The system of claim 1, wherein when the calculated expected output power amount is equal to or greater than a predetermined reference power amount, the controller is configured determine a state of charge (SOC) data of the main battery and the auxiliary battery and select a battery requiring charging, and charge the selected battery.

3. The system of claim 2, wherein the reference power amount is a minimum power amount consumed for maintaining the control of an electronic component of the vehicle in the state where the vehicle is not started.

4. The system of claim 1, wherein the controller includes a converter configured to boost a voltage of electromotive force generated in the solar cell panel and a direct-current (DC)-DC converter configured to convert the boosted electromotive force.

5. A method of controlling a solar roof, comprising:
   receiving, by a controller, light amount data collected in a solar cell panel from a light amount sensor and receiving current temperature data of a surface of the solar cell panel from a temperature sensor; and
   calculating, by the controller, an expected output power amount corresponding to the received light amount data and temperature data by referring to a table map of expected output power amounts according to light amount and temperature conditions of the corresponding solar cell panel stored in a linked memory,
   wherein the controller is configured to operate a main battery and an auxiliary battery of a vehicle to be charged based on the calculated expected output power amount;
   wherein when a voltage of power generated in the solar cell panel is equal to or greater than a predetermined initial start voltage, the controller is configured to start and calculate the expected output power amount;

wherein the expected output power amount is a power amount calculated using a graph of voltage and current characteristics according to the light amount data and a graph of a power characteristic according to the temperature data, and is pre-stored in a memory linked to the controller; and wherein the expected output power amount is calculated by:

$$Y = P\max * S_{light} * [1 - \{(C - Troof) * A\}]$$

wherein, * Introductory remark, Y: Expected output power amount (unit: W), Pmax: Maximum outputtable power of the solar cell panel (unit: W), $S_{light}$: Light amount (light amount in the case of the maximum outputtable power of the solar cell panel (unit: SUN)), C: Surface temperature condition in the case of the maximum outputtable power of the solar cell panel (° C.), Troof: Surface temperature of the solar cell panel (° C.), and A: Characteristic coefficient of the solar cell panel.

6. The method of claim 5, further comprising:
prior to receiving current temperature data, determining, by the controller, whether a voltage of power currently generated in the solar cell panel is equal to or greater than an initial start voltage set in the memory linked to the controller, wherein when the voltage of power currently generated in the solar cell panel is equal to or greater than the initial start voltage, receiving the light amount data and receiving the temperature data.

7. The method of claim 5, wherein the operating, by the controller, the charging of the main battery and the auxiliary battery of the vehicle based on the calculated expected output power amount includes:
determining, by the controller, whether the calculated expected output power amount is equal to or greater than a predetermined reference power amount;
when the calculated expected output power amount is equal to or greater than the predetermined reference power amount, checking, by the controller, a state of charge (SOC) data of the main battery and the auxiliary battery and selecting a battery requiring charging; and
when the battery requiring the charging is selected, charging the selected battery.

8. The method of claim 7, wherein the reference power amount is a minimum power amount consumed for maintaining the control of an electronic component of the vehicle in the state where the vehicle is not started.

9. The method of claim 7, further comprising:
after charging the selected battery, determining, by the controller, whether output power of the solar cell panel is equal to or greater than the reference power amount; and
when the output power of the solar cell panel is equal to or greater than the reference power amount, continuously charging the selected battery, and when the output power of the solar cell panel is less than the reference power amount, stopping the charging of the selected battery.

* * * * *